US012795289B2

(12) United States Patent
Petrov et al.

(10) Patent No.: US 12,795,289 B2
(45) Date of Patent: Nov. 10, 2026

(54) HEADPHONE HEADBAND WITH INTEGRAL YOKE PIVOT

(71) Applicant: Bose Corporation, Framingham, MA (US)

(72) Inventors: Alexander Stefanov Petrov, Marlborough, MA (US); Zhen Xu, Milford, MA (US); Allen Timothy Graff, Sutton, MA (US)

(73) Assignee: Bose Corporation, Framingham, MA (US)

( * ) Notice: Subject to any disclaimer, the term of this patent is extended or adjusted under 35 U.S.C. 154(b) by 162 days.

(21) Appl. No.: 18/953,571

(22) Filed: Nov. 20, 2024

(65) Prior Publication Data

US 2026/0143274 A1 May 21, 2026

(51) Int. Cl.
*H04R 1/02* (2006.01)
*H04R 1/10* (2026.01)

(52) U.S. Cl.
CPC .......... *H04R 1/105* (2013.01); *H04R 1/1008* (2013.01)

(58) Field of Classification Search
CPC .............................. H04R 1/105; H04R 1/1008
See application file for complete search history.

(56) References Cited

U.S. PATENT DOCUMENTS

| | | | | |
|---|---|---|---|---|
| 2009/0268936 | A1 | 10/2009 | Goldberg et al. | |
| 2014/0205130 | A1 | 7/2014 | Blair et al. | |
| 2024/0048885 | A1 | 2/2024 | Graff et al. | |
| 2024/0048886 | A1 | 2/2024 | Graff et al. | |
| 2024/0048887 | A1* | 2/2024 | Graff | H04R 5/0335 |
| 2025/0193578 | A1 | 6/2025 | Xu et al. | |

OTHER PUBLICATIONS

PCT International Search Report and Written Opinion for International Application No. PCT/US2025/052834, mailing date Jan. 7, 2026, 10 pages.

* cited by examiner

*Primary Examiner* — Ammar T Hamid
(74) *Attorney, Agent, or Firm* — Hoffman Warnick LLC

(57) ABSTRACT

Aspects include headphones and headbands for headphones. In certain cases, a headphone headband includes: a cushion assembly; a slider telescopically coupled to the cushion assembly; an earphone; and a yoke coupling the earphone to the slider. The yoke can include an integral pivot mechanism.

20 Claims, 18 Drawing Sheets

HEADPHONE HEADBAND WITH INTEGRAL YOKE PIVOT

BACKGROUND

The disclosure relates generally to wearable audio devices. More particularly, the disclosure relates to headphones and related headbands.

SUMMARY

Various implementations are directed to headphones and related headbands for headphones. In certain cases, a headphone headband includes an integral yoke pivot.

In particular cases, a headphone headband includes: a cushion assembly; a slider telescopically coupled to the cushion assembly; an earphone; and a yoke coupling the earphone to the slider, where the yoke includes: a first yoke section having a first set of force-fit couplers and a pivot member holder; a second yoke section having a second set of force-fit couplers that complement and couple with the first set of force-fit couplers on the first yoke section; and a pivot member in the pivot member holder, where coupling between the first yoke section and the second yoke section is maintained by interaction between the first set of force-fit couplers and the second set of force-fit couplers.

In additional particular cases, a headphone headband includes: a cushion assembly; a slider telescopically coupled to the cushion assembly; an earphone; and a yoke coupling the earphone to the slider, wherein the yoke includes: a first yoke section having: a pivot member holder, and a set of bosses for receiving a set of couplers; a second yoke section having a set of slots corresponding with the set of bosses on the first yoke section; the set of couplers extending through the set of bosses and the set of slots to couple the first yoke section and the second yoke section; and a pivot member in the pivot member holder.

All examples and features mentioned below can be combined in any technically possible way.

In certain cases, the pivot member includes an internal slot housing wiring extending through the yoke.

In some aspects, the first set of force-fit couplers and second set of force-fit couplers provide a snap fit coupling between the first yoke section and the second yoke section.

In certain cases, the coupling between the first yoke section and the second yoke section is approximately entirely maintained by the interaction between the first set of force-fit couplers and the second set of force-fit couplers.

In particular aspects, the coupling between the first yoke section and the second yoke section is fastener-free. In some examples, the fastener-free coupling is without a screw or a pin.

In some cases, the second set of force-fit couplers include tabs having internal slots, and the first set of force-fit couplers include protrusions that mate with the internal slots.

In certain implementations, the pivot member holder includes a set of slots that complement a set of projections on the second yoke section.

In some aspects, the pivot member has a set of external grooves.

In certain cases, the set of projections engage the external grooves to secure the pivot member between the first yoke section and the second yoke section.

In some aspects, the set of projections limit movement of the pivot member along a primary axis of the pivot member holder. In some examples, the primary axis of the pivot member holder is the axis of wiring going through the holder.

In particular cases, the pivot member includes a rotation limiter that interfaces with a limiter slot in the first yoke section. In some examples, the rotation limiter is proximate the upper surface. In certain examples, the limiter slot includes a cam slot.

In certain aspects, the set of couplers include a set of screws, and the set of bosses and the set of slots include internal threads complementing threads on the set of screws.

In particular cases, the yoke includes a trunk section and legs extending from the trunk section, the legs having: an outer surface, an inner surface opposing the outer surface, an upper surface, and a lower surface opposing the upper surface.

In some aspects, the second yoke section forms a portion of the inner surface and the lower surface, and the set of couplers extend through the set of slots from the lower surface. In certain examples, the second yoke section extends up a portion of the neck.

In particular cases, the set of couplers are obstructed from view from an outside of the headband.

In some aspects, the set of bosses include a first boss having a first depth and a second boss having a second depth, where the first depth provides clearance for routing of wiring around the first boss. In certain examples, the distinct boss depths define asymmetric bosses that enable routing of wiring. In some examples, the bend angle or turn mitigates stress on the wiring, which can extend the lifespan and/or reliability of such wiring.

In certain cases, the pivot member includes an internal slot housing wiring extending through the yoke.

In particular implementations, the pivot member holder includes a set of slots that complement a set of projections on the second yoke section.

In some cases, the pivot member has a set of external grooves, where the set of projections engage the external grooves to secure the pivot member between the first yoke section and the second yoke section, and where the set of projections limit movement of the pivot member along a primary axis of the pivot member holder.

In particular aspects, the pivot member includes a rotation limiter that interfaces with a limiter slot in the first yoke section.

In some cases, the set of bosses includes two bosses, three bosses, four bosses, or more bosses.

In particular cases, the headband further includes an electro-acoustic transducer housed in the earphone for providing an audio output.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

Figure 1:
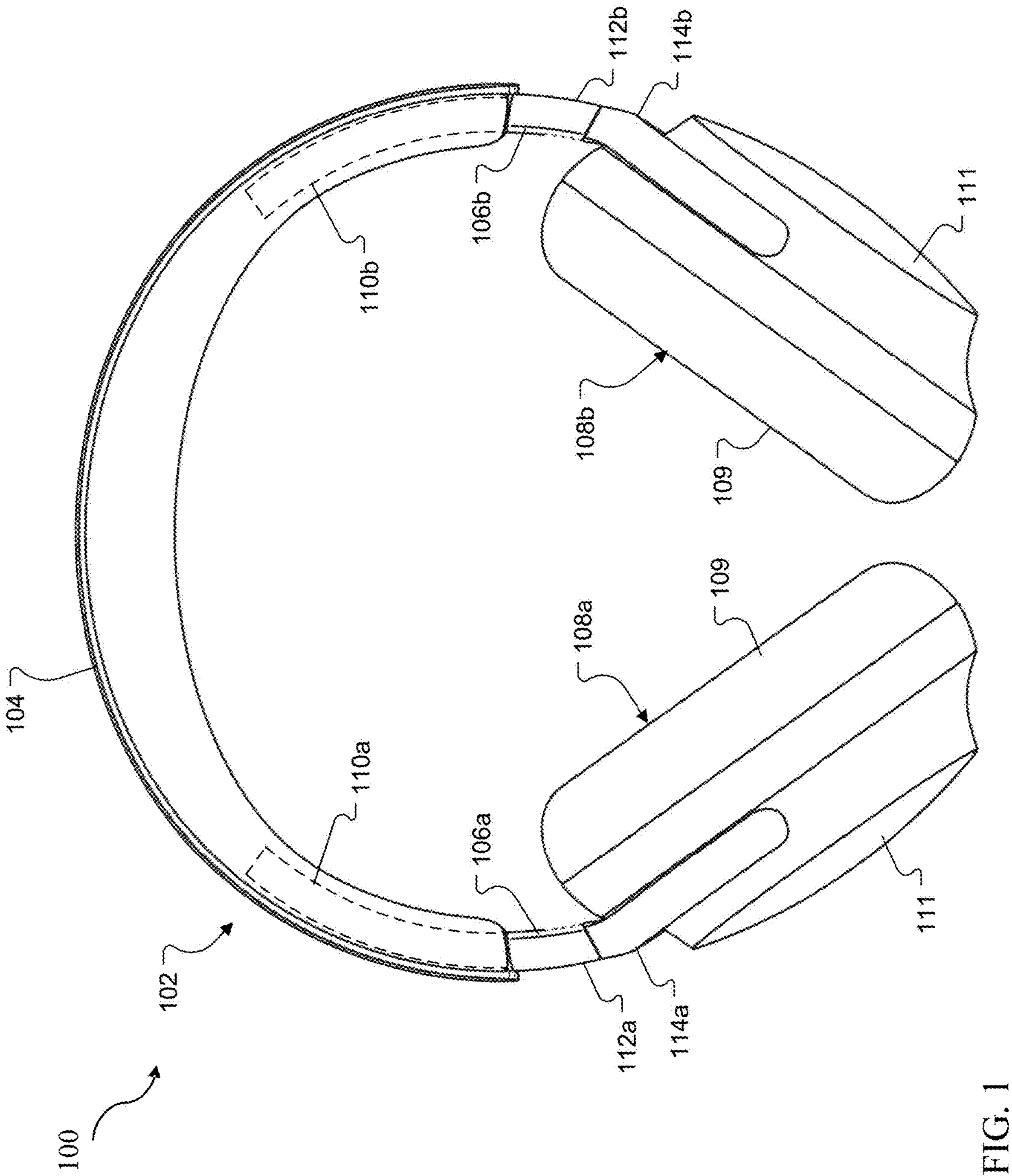
FIG. 1 is a perspective view of one example headphone according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Various disclosed implementations include headphone headbands that include an integral yoke pivot. These implementations may reduce manufacturing costs and/or complexity relative to conventional headphone headbands. Further, the disclosed implementations can enhance the visual appeal of headphones relative to conventional devices, for example, by reducing or eliminating visible couplings in portions of the headphone.

Commonly labeled components in the FIGURES are considered to be substantially equivalent components for the purposes of illustration, and redundant discussion of those components is omitted for clarity.

Headphone

FIG. 1 shows headphones 100 according to various implementations. Headphones 100 include headband 102 which includes flat tubular cushion assembly 104 that is constructed and arranged to be placed over the crown of the head of a person. In some examples, tubular sliders 106*a* and 106*b* (collectively "106") support earphones 108*a* and 108*b* (collectively "108"). The sliders engage with cushion assembly 104 in a manner which allows the sliders to be moved in and out of the cushion assembly to adjust the overall length of the headband so that they headphones can sit comfortably on, in or over the ears of the wearer. This overall arrangement of headphones is known in the art. Also, in some cases a microphone (not shown) can be included so that the headphones can be used as a headset. Further, some headphones or headsets include only one earphone, in which case there may be only one slider.

In certain cases, cushion assembly 104 is generally tubular. This arrangement allows the sliders to be received within the volume on the inside of the tube and also allows wiring to pass along the length of the cushion assembly. Alternative shapes of cushion assembly 104 are also possible. Sliders 106*a* and 106*b* are located in part in this interior volume of the cushion assembly. Each slider 106 has a proximal end 110*a*, 110*b* located in the cushion assembly (e.g., end 110*a* of slider 106*a*) and a distal end 112*a*, 112*b* (e.g., end 112*a* of slider 106*a*). Coupling members 114*a* and 114*b* (collectively "114") are pivotably coupled to sliders 106. The coupling members each carry an earphone 108 (a/k/a "earpiece") at their far ends. Earphones 108*a* and 108*b* are shown in FIG. 1. Each of the earphones 108 includes an ear cushion 109 and an earcup 111 that supports an electro-acoustic transducer 113 (FIG. 2).

In some non-limiting examples, the sliders each generally hollow tubes with a generally flat exterior surface that lies closest to the head. The sliders may have an oblong cross-sectional shape, such as a stadium (aka "racetrack"), oval or elliptical shape. Various additional shapes are also possible according to implementations.

Figure 2:
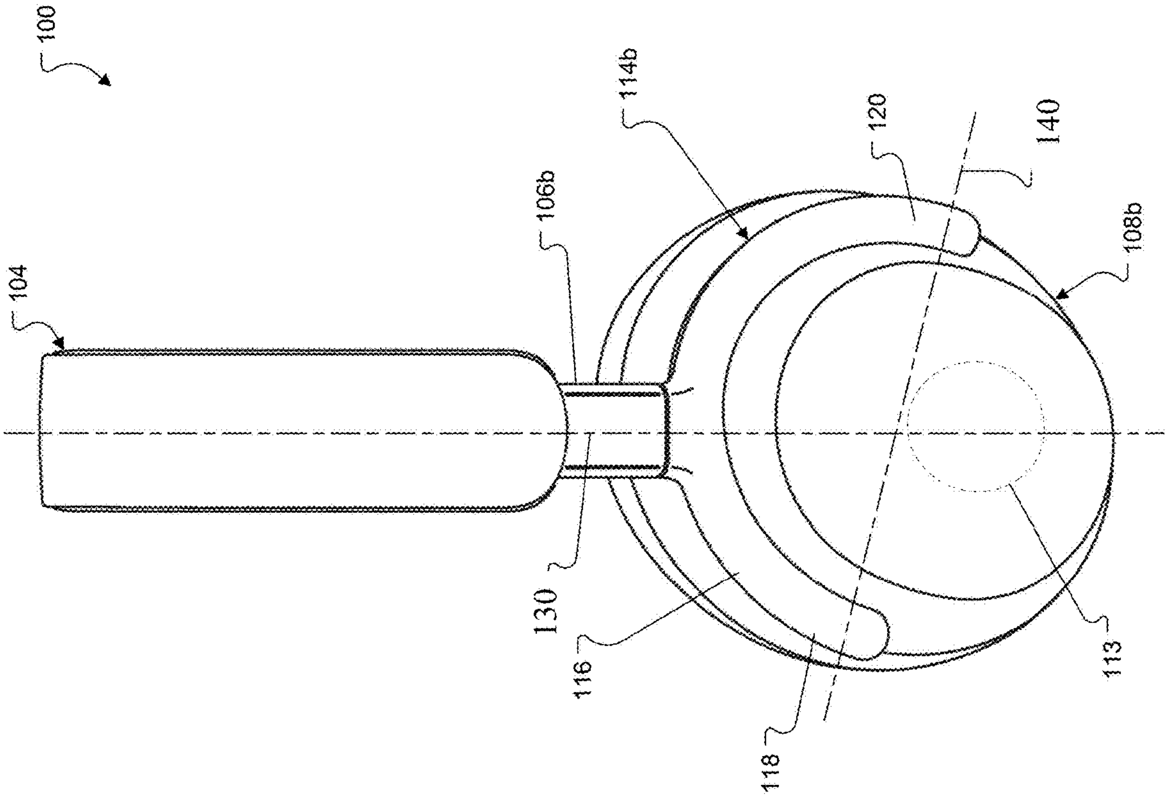
FIG. 2 is a side perspective of the headphone of FIG. 1 according to various implementations.

An example of a coupling member 114*b* is shown in more detail in FIG. 2. FIG. 2 shows a left coupling member 114*b* in headphones 100. A mirror-image of the design would be used for the right coupling member 114*a*. Coupling member 114*b* includes a yoke 116 with legs 118 and 120 that carry earphone 108. Earphone coupling members (not shown) are coupled to earphone 108*b* and allow it to rotate about axis 130. Also, coupling member 114*b* is engaged with slider 106*b* in a manner to allow the yoke to pivot about axis 140.

Additional features of the headphones 100, such as the conductive cable interconnecting earphones 108*a* and 108*b* are not illustrated but are known in the art, for example, as described in U.S. patent application Ser. No. 17/881,964 (Headphones, published as US PG Publication 2024/0048887), filed Aug. 5, 2022, the entire contents of which are hereby incorporated by reference.

Headband

The following provides further description of an example headband for headphones, e.g., headphones 100. Distinct headband configurations disclosed herein can be compatible with headphones 100, as well as other headphone designs. In some cases, distinct headband types are noted by "A", "B", etc. Certain implementations include yoke configurations that are compatible with the headphone 100, e.g., yoke 116. In some cases, yoke configurations can be substituted for yoke 116 in FIGS. 1 and 2. Similarly labeled features in the drawings can be considered to be substantially similar components.

Further, various implementations include sets of couplers between components. In some cases, couplers are described and/or depicted as being complementary or providing an interface between components. The couplers can be described and/or depicted as providing male/female connections in some cases. It is understood that any depiction of couplers shown and described herein can be inverted (or, reversed) to provide similar function with a different configuration, e.g., a male/female coupling can be altered to a female/male coupling, without deviating from the disclosed implementations.

Figure 3:
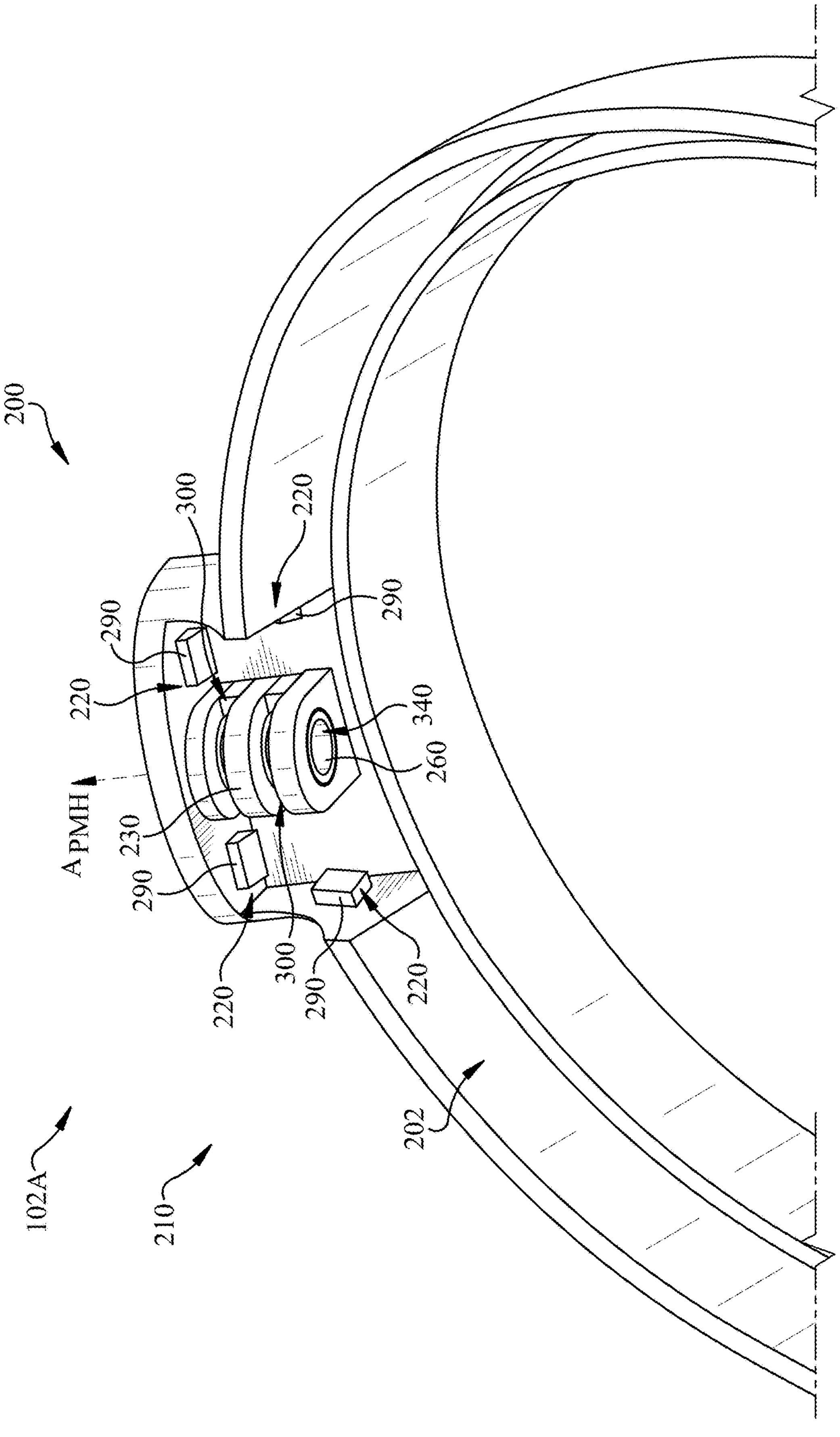
FIG. 3 is a cross-sectional perspective of a portion of a yoke in a headphone according to various implementations.
Figure 4:
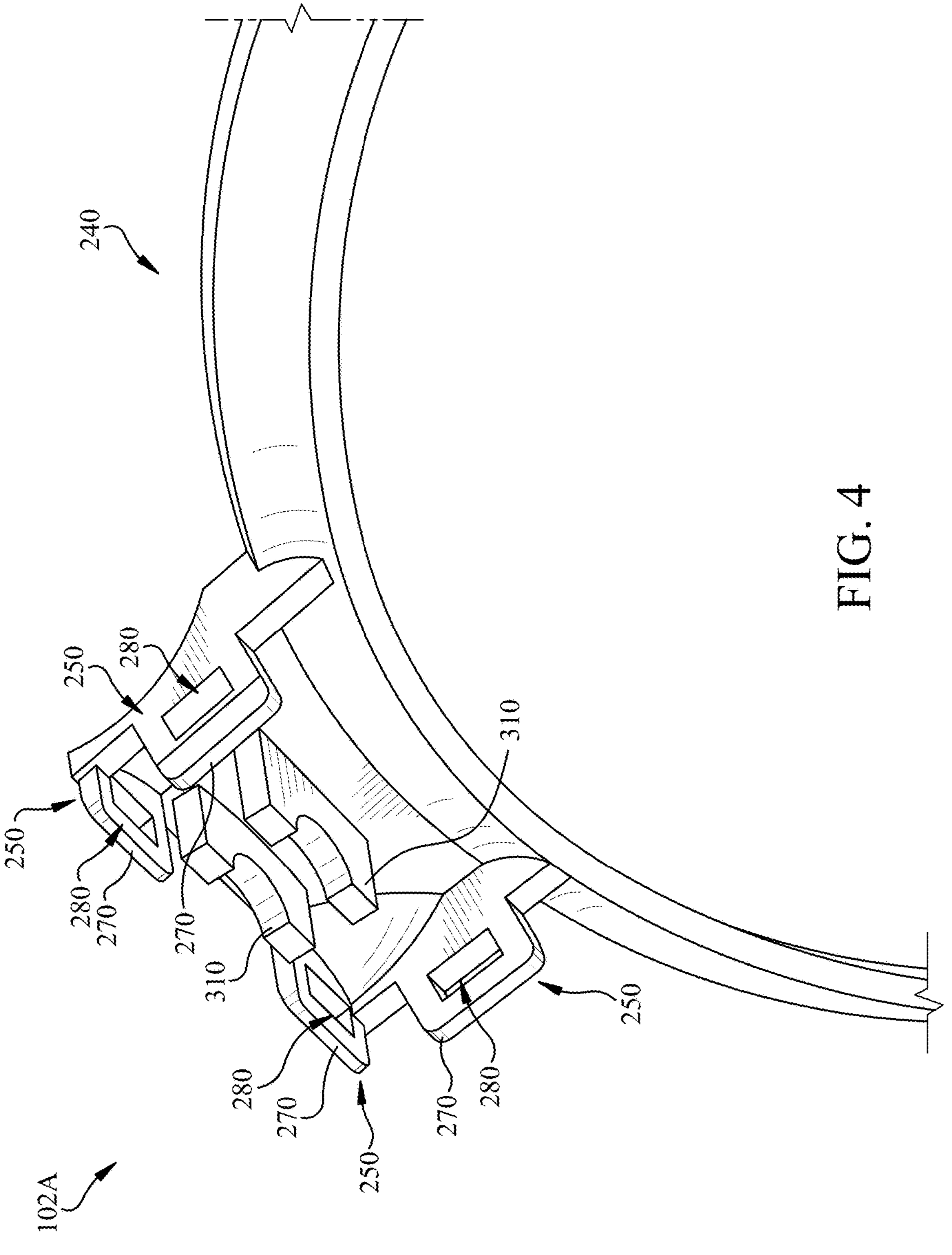
FIG. 4 is a cross-sectional perspective of another portion of a yoke in a headphone according to various implementations.

Turning to FIGS. 3-7, a first implementation of a headphone headband 102A is illustrated. As noted herein, the headband 102A includes a yoke 200 coupling the earphone 108 to the slider 106 (FIGS. 1 and 2). In some cases, the yoke 200 includes a first yoke section 210 having a first set of force-fit couplers 220 and a pivot member holder 230 (FIG. 3). Further, the yoke 200 can include a second yoke section 240 having a second set of force-fit couplers 250 that complement and couple with the first set of force-fit couplers 220 on the first yoke section 210 (FIG. 4). In particular implementations, the yoke 200 includes a pivot member 260 in the pivot member holder 230 (FIG. 3). In some cases, the pivot member 260 includes a pin or other cylindrical component configured to rotate relative to the yoke 200, e.g., enabling rotation about axis 130 (FIG. 2).

As described herein, in various implementations, coupling between the first yoke section 210 and the second yoke section 240 is maintained by interaction between the first set of force-fit couplers 220 and the second set of force-fit couplers 250. In some aspects, the first set of force-fit couplers 220 and second set of force-fit couplers 250 provide a snap fit (or press fit) coupling between the first yoke section 210 and the second yoke section 240. In further example cases, the coupling between the first yoke section 210 and the second yoke section 240 is approximately entirely maintained by the interaction between the first set of force-fit couplers 220 and the second set of force-fit couplers 250. In particular examples implementations, the coupling between the first yoke section 210 and the second yoke section 240 is fastener-free, e.g., without a screw or a pin. As illustrated in the example depiction in FIG. 4, the second set of force-fit couplers 250 can include tabs 270 having internal slots 280 (e.g., slots 280 extending through at least a portion of tabs 270). In these cases, first set of force-fit couplers 210 can include protrusions 290 that mate with the internal slots 280.

Figure 5:
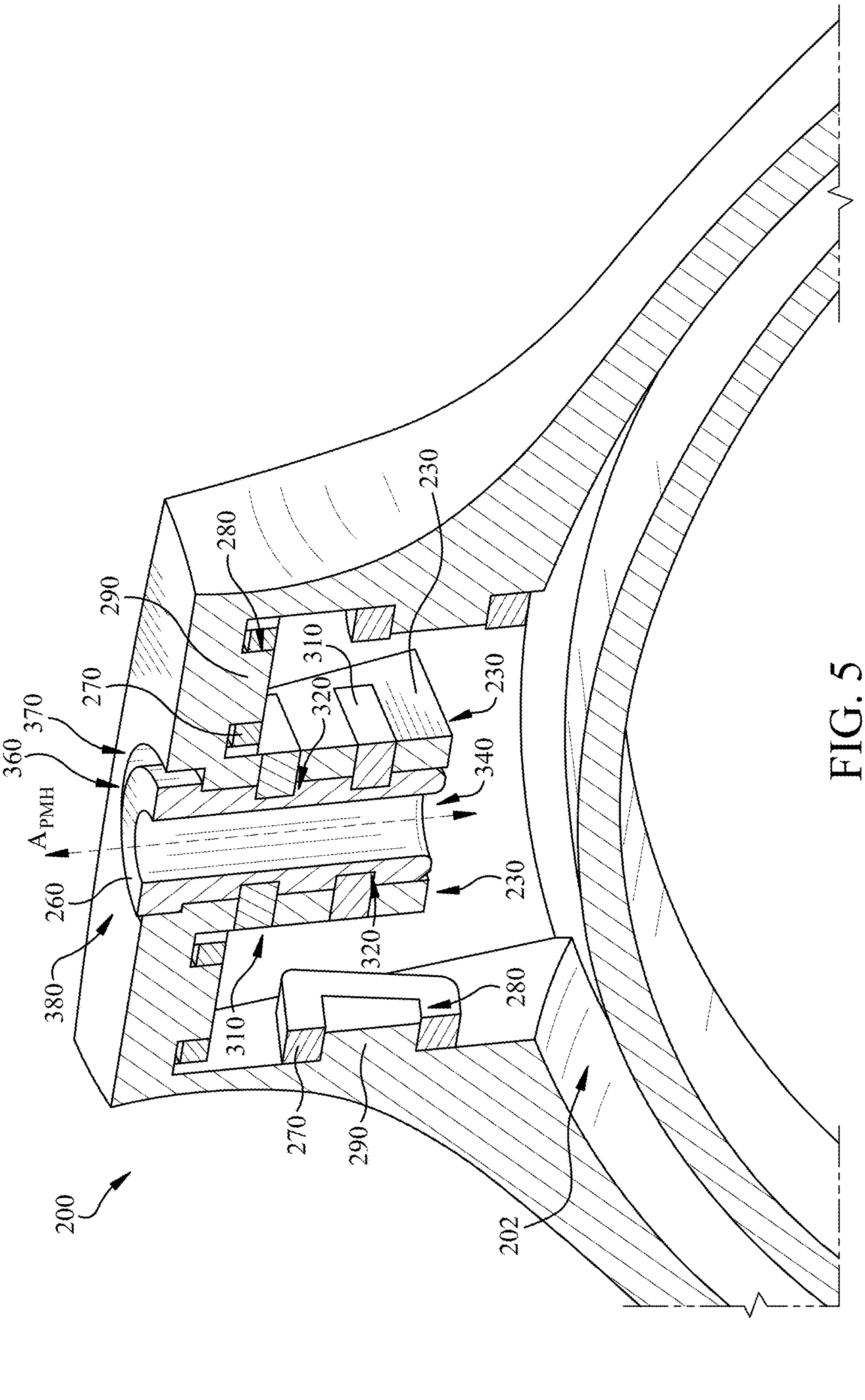
FIG. 5 is a cross-sectional perspective of a portion of a yoke according to various implementations.
Figure 6:
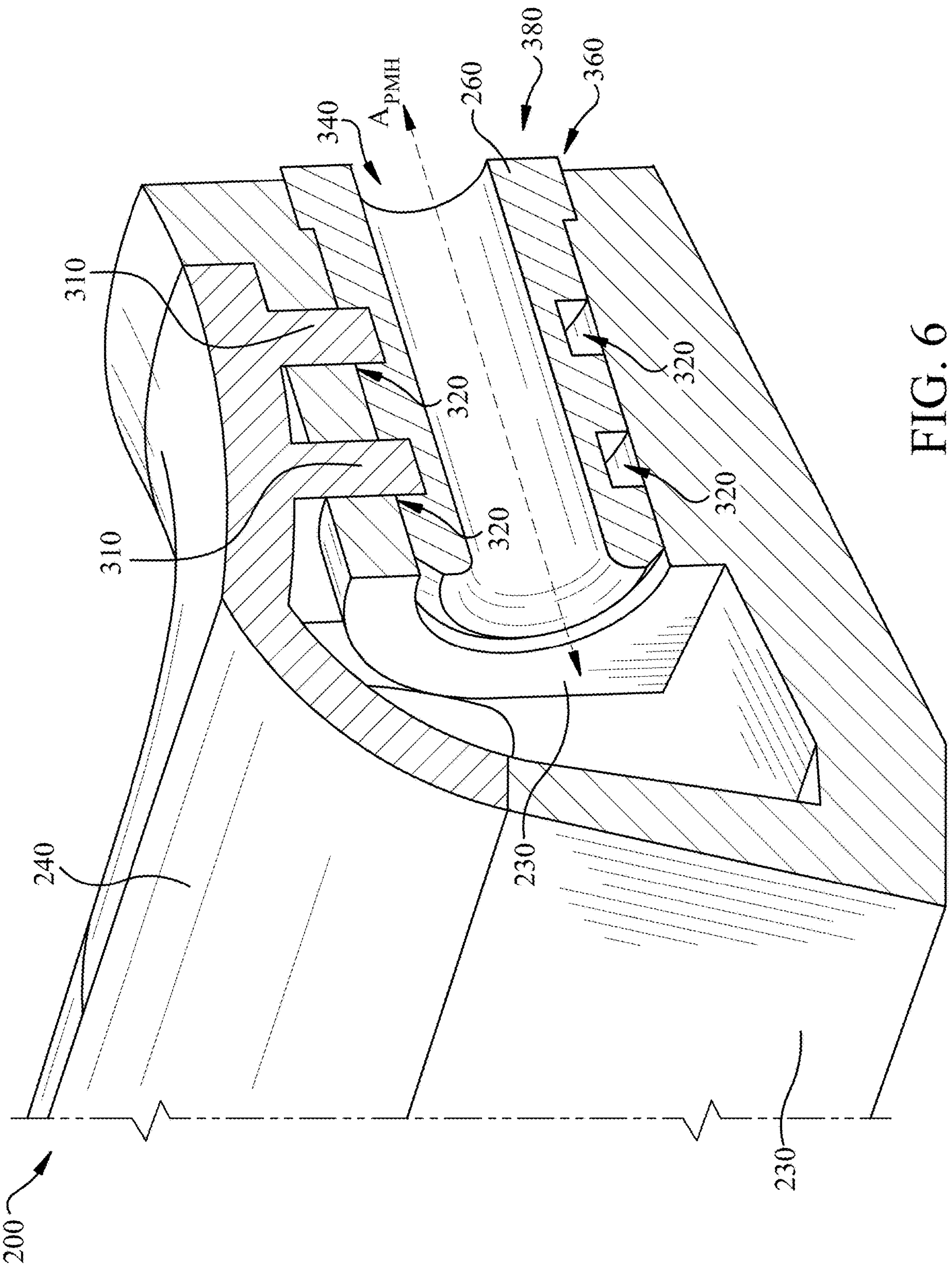
FIG. 6 is a cross-sectional perspective view of a portion of a yoke according to various additional implementations.

As illustrated in particular in FIGS. 3 and 4, the pivot member holder 230 can include a set of slots 300 that complement a set of projections 310 on the second yoke section 240. As shown in FIGS. 5 and 6, the pivot member 260, can in some cases, have a set of external grooves 320. The projection(s) 310 can engage the external grooves 320 to secure the pivot member 260 between the first yoke section 210 and the second yoke section 240. In certain cases, the set of projections 310 limit movement of the pivot member 260 along a primary axis ($A_{PMH}$) of the pivot member holder 230. In some examples, the primary axis ($A_{PMH}$) of the pivot member holder 230 is the axis of wiring (e.g., wiring 490 in FIGS. 9-14) going through the holder 230. For example, the pivot member 260 can include an internal slot 340 housing wiring 490 (FIG. 9) that extends through the yoke 200, and the primary axis ($A_{PMH}$) of the pivot member holder 230 is aligned with the axis of the portion of the wiring 490 (FIG. 9) extending through the yoke 200 (e.g., via recess, or slot 202 shown in first section 210).

Figure 7:
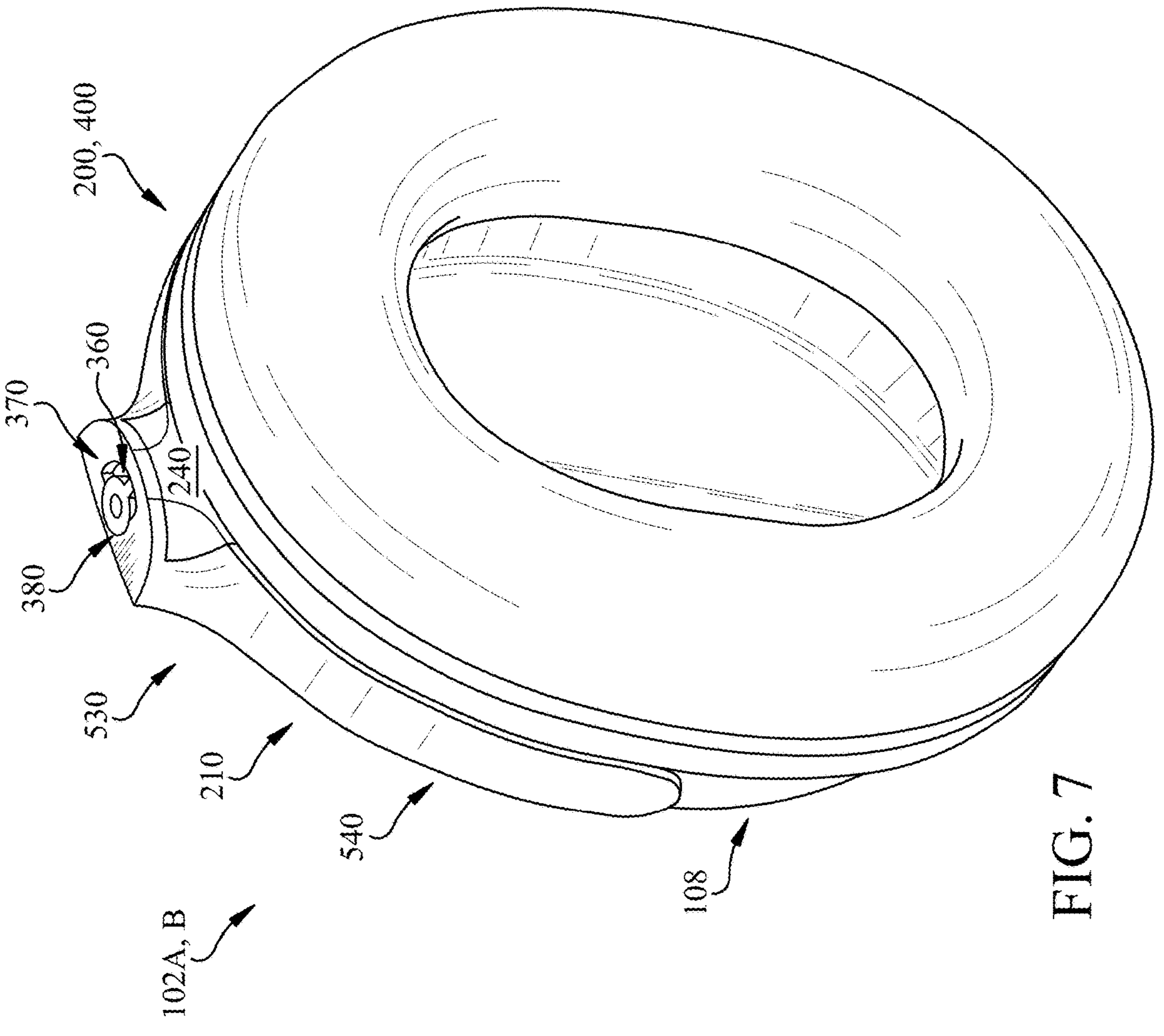
FIG. 7 is a perspective view of an earcup and yoke according to various implementations.
Figure 16:
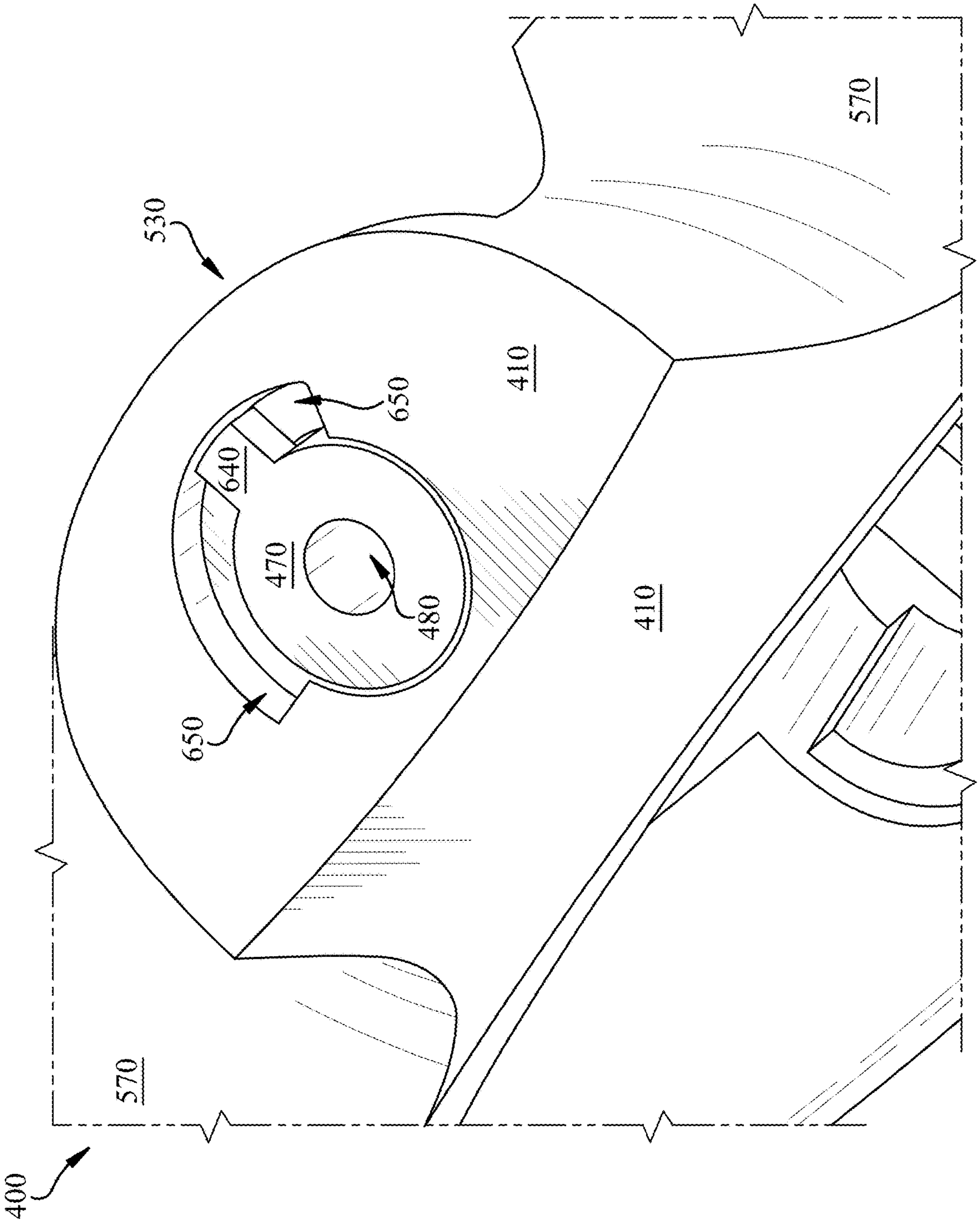
FIG. 16 shows a perspective view of a portion of a yoke according to various implementations.

As illustrated in FIGS. 5-7, the pivot member 260 can include a rotation limiter 360 that interfaces with a limiter slot 370 in the first yoke section 210. In some examples, the rotation limiter 360 is proximate an upper surface 380 of the yoke pivot member 260, and includes a tab, protrusion, or extension. In certain examples, the limiter slot 370 includes a cam slot, and the rotation limiter 360 includes a cam member configured to interface with the limiter slot 370. Interfacing between the rotation limiter 360 and slot 370 can limit rotation of the pivot member 260, e.g., over only a certain rotational range such as over approximately 60 degrees, approximately 90 degrees, approximately 120 degrees, approximately 150 degrees, approximately 180 degrees, etc. In certain examples, the rotational range is approximately 105 degrees. In further examples, the rotational range is approximately 120 degrees. It is understood that rotation limiters shown and described herein (e.g., in FIGS. 7, and 16) can be substituted for one another in various implementations where practicable.

In another implementation of a headband 102B illustrated in FIGS. 8-16, in addition to the cushion assembly 104, slider 106, and earphone 108, a yoke 400 is shown coupling the earphone 108 to the slider 106 (FIGS. 1 and 2). In some cases, the yoke 400 includes a first yoke section 410 including a pivot member holder 420, and a set of bosses 430 for receiving a set of couplers 440 (FIGS. 9-15). In some example implementations, the set of bosses 430 includes two bosses, three bosses, four bosses, or more bosses. The yoke 400 can also include a second yoke section 450 having a set of slots 460 corresponding with the set of bosses 430 on the first yoke section 410. In particular implementations, the set of couplers 440 extend through the set of bosses 430 and the set of slots 460 to couple the first yoke section 410 and the second yoke section 450. In certain cases, the yoke 400 further includes a pivot member 470 in the pivot member holder 420. The pivot member 470 can include an internal slot 480 housing wiring 490 that extends through the yoke 400. Wiring 490 can enable power transmission, signal (e.g., audio signal) transmission, communication signal transmission, etc.

Figure 9:
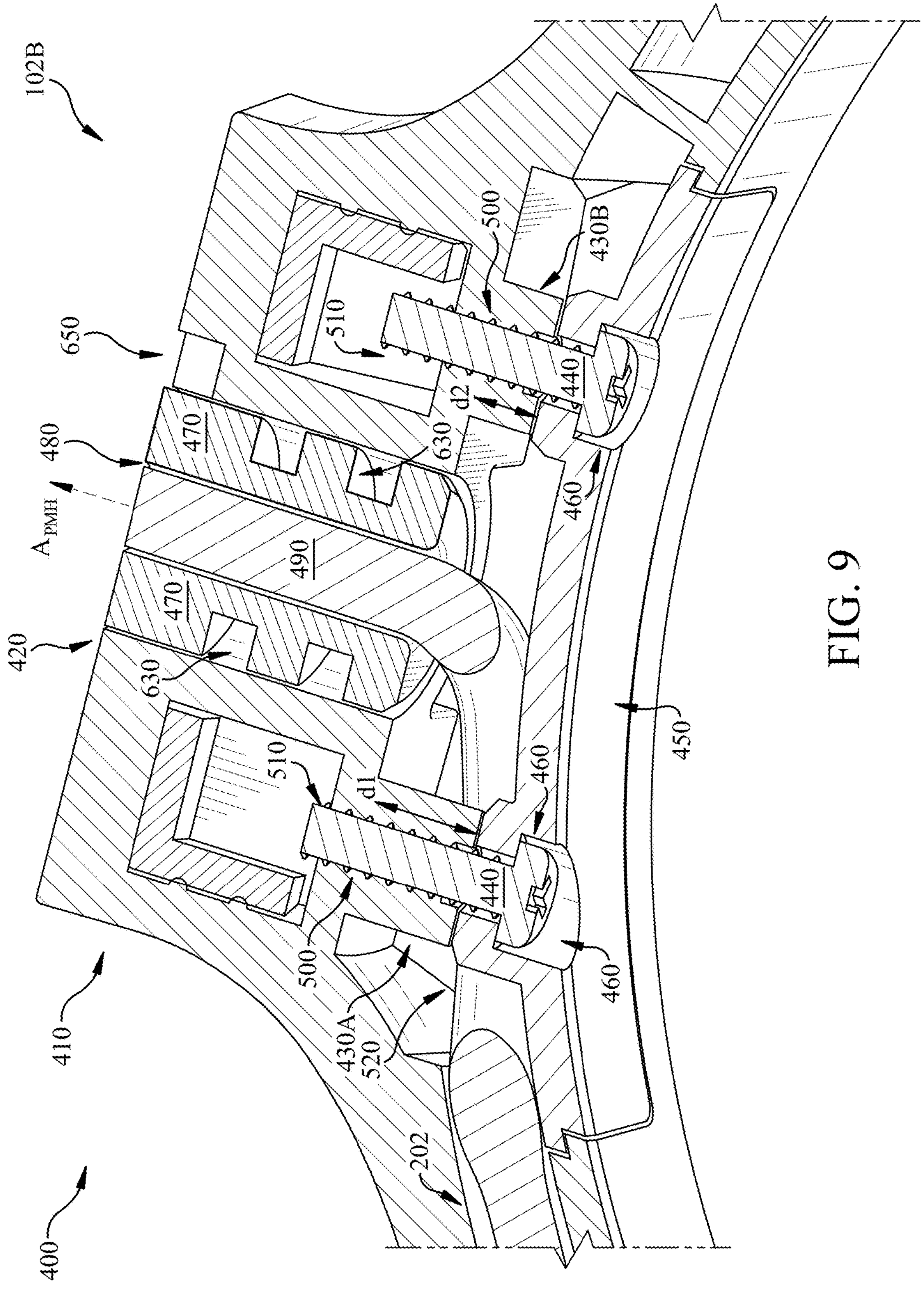
FIGS. 9-13 show partial sectional views of the yoke of FIG. 8 according to various implementations.
Figure 12:
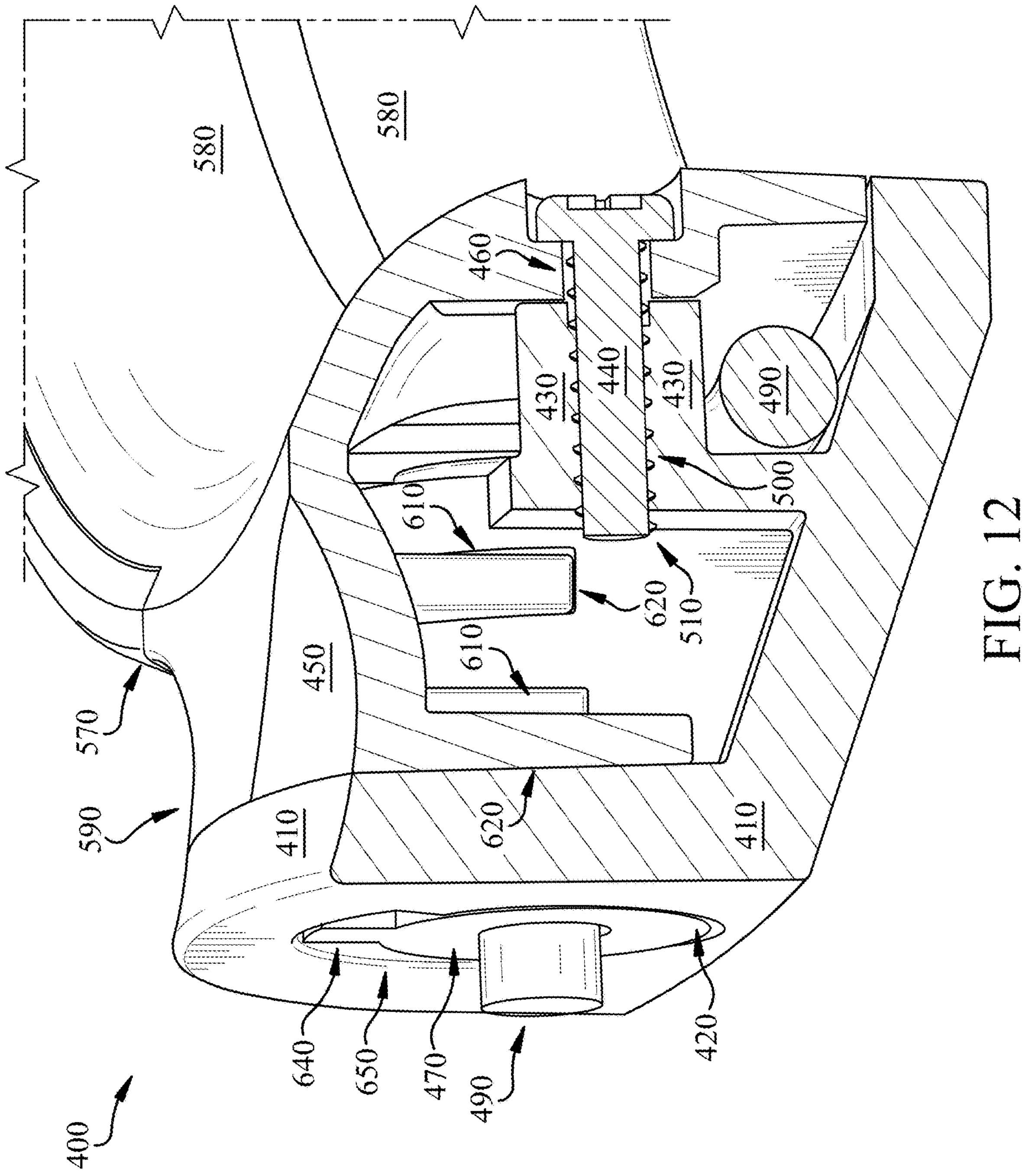
Figure 13:
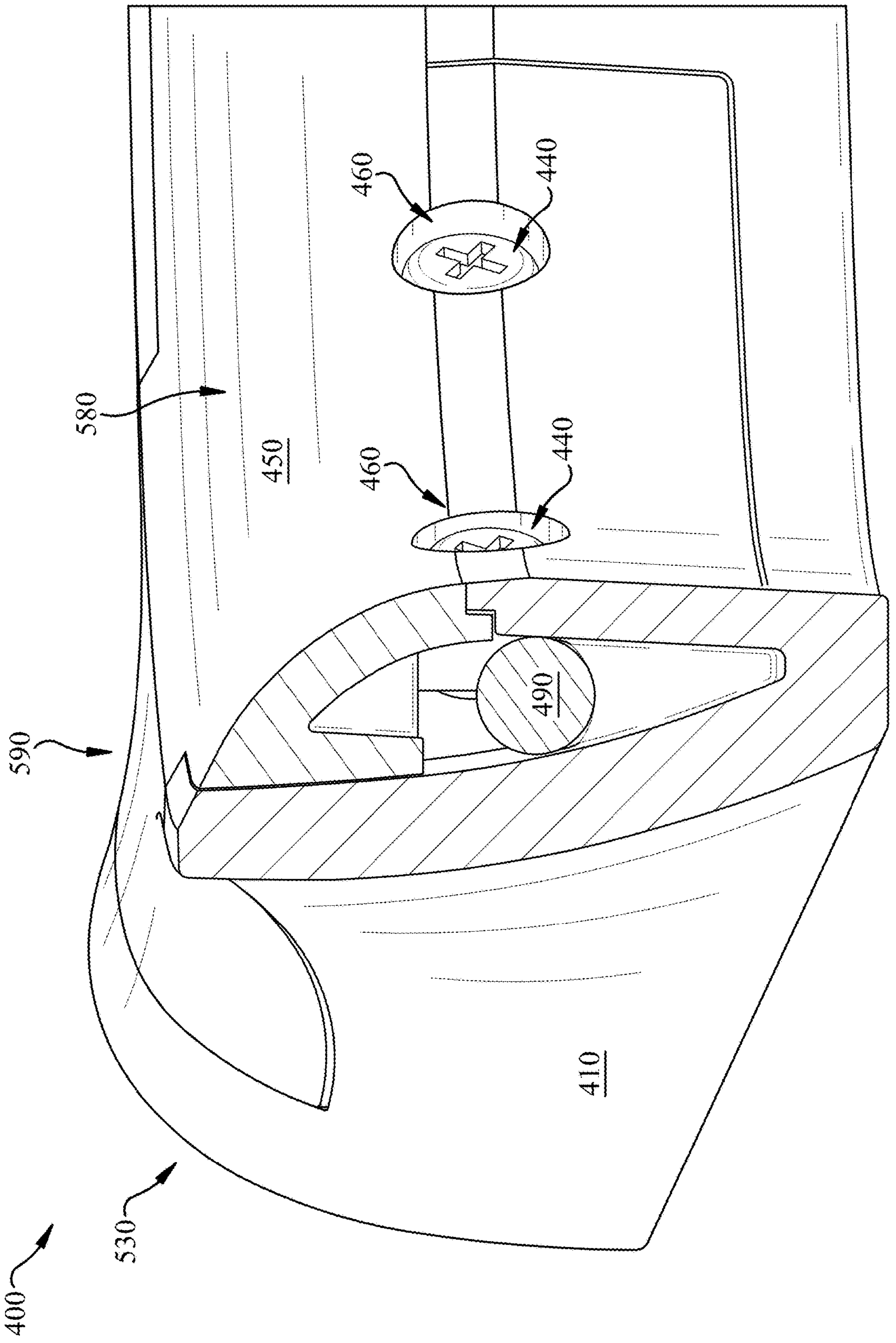

In particular cases, the set of couplers 440 include a set of threaded connectors such as screws. In certain example cases, such as where couplers 440 include threaded connectors, the bosses 430 (in first yoke section 410) and slots 460 (in second yoke section 450) include internal threads 500 that complement threads 510 on the couplers (e.g., screws) 440, e.g., as shown in FIGS. 9 and 12. While threaded connectors are illustrated in some cases, other couplers and corresponding slots and bosses are also possible, e.g., pins, force-fit connectors, press-fit connectors, expandable connectors, etc.

Figure 10:
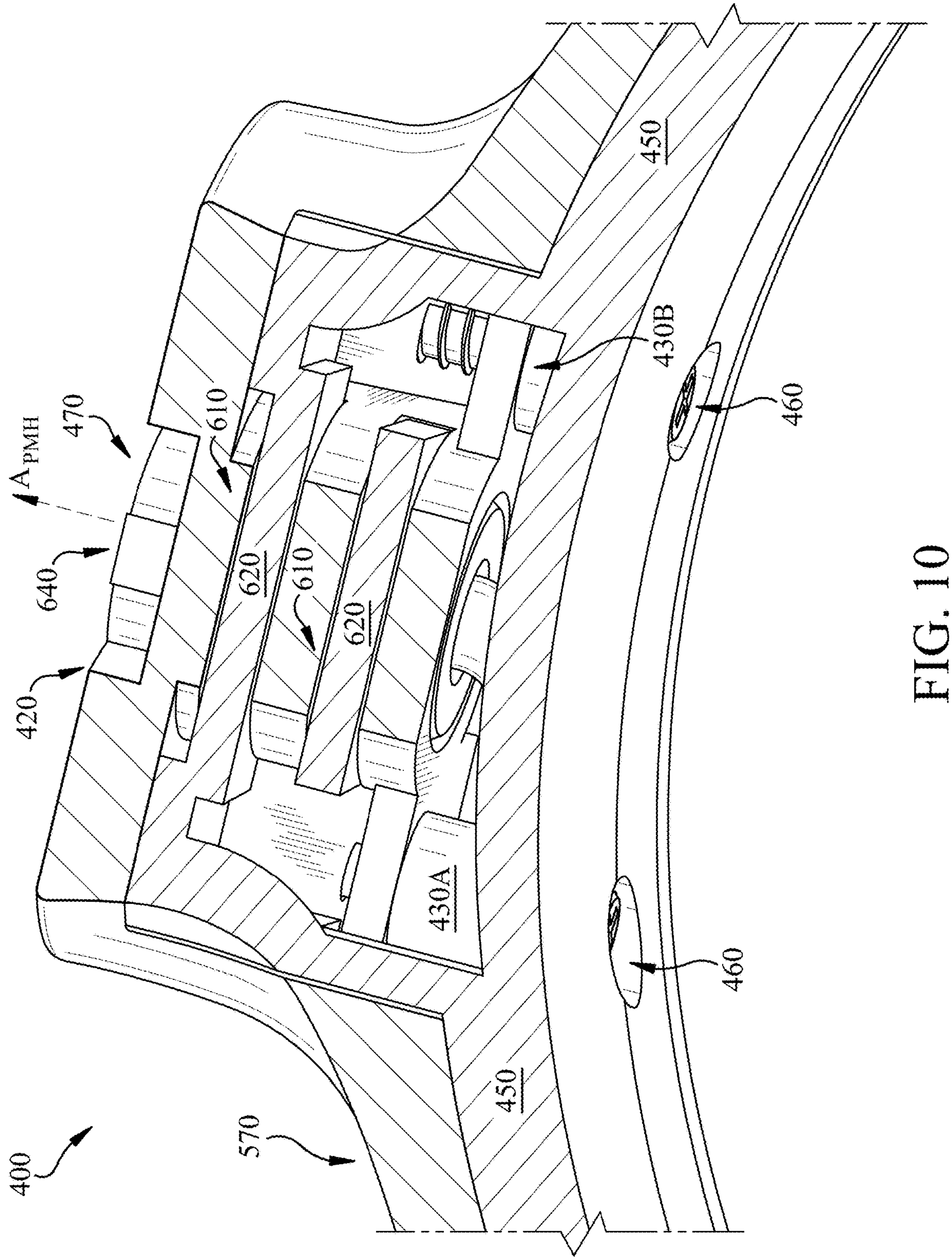
Figure 11:
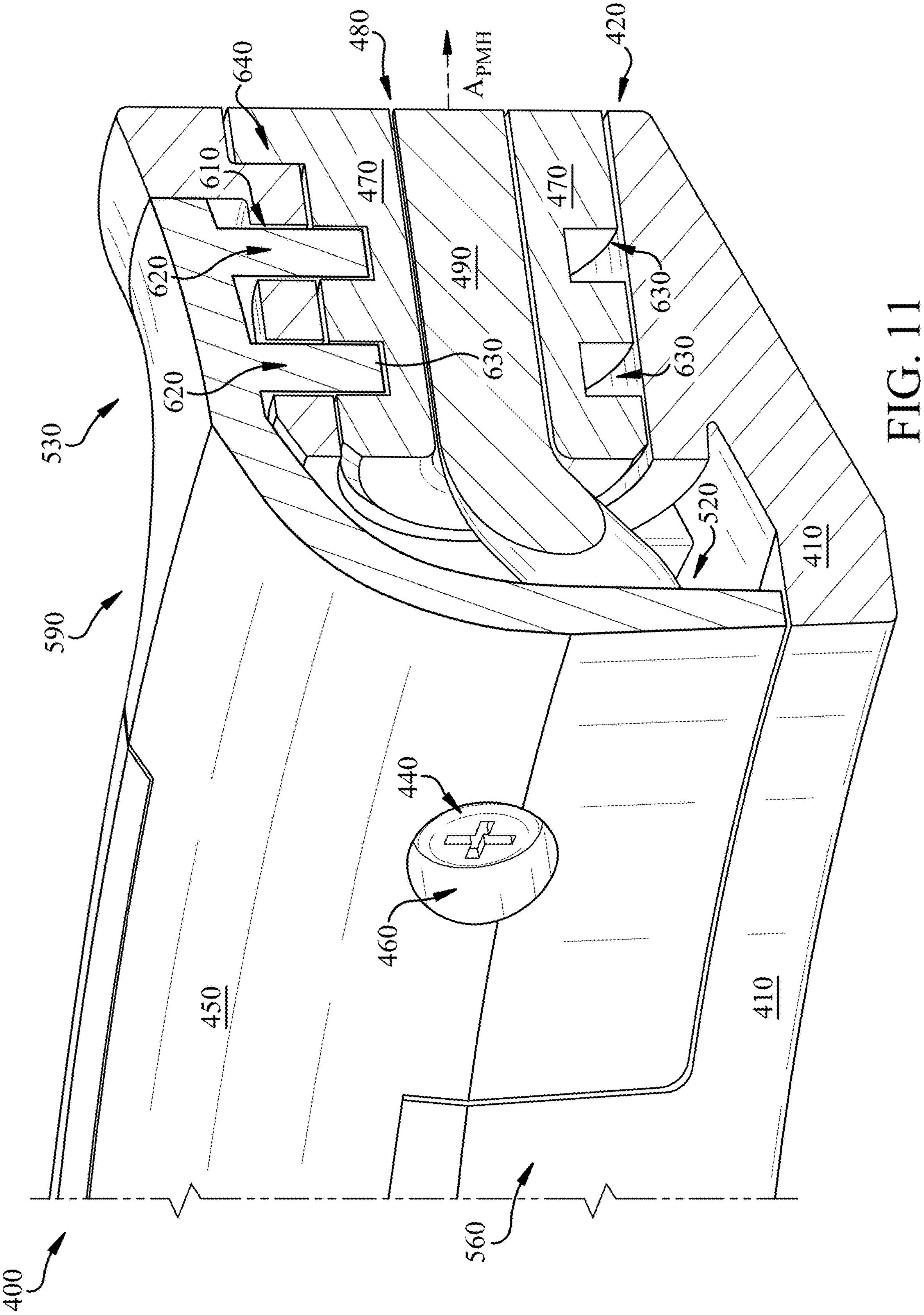
Figure 14:
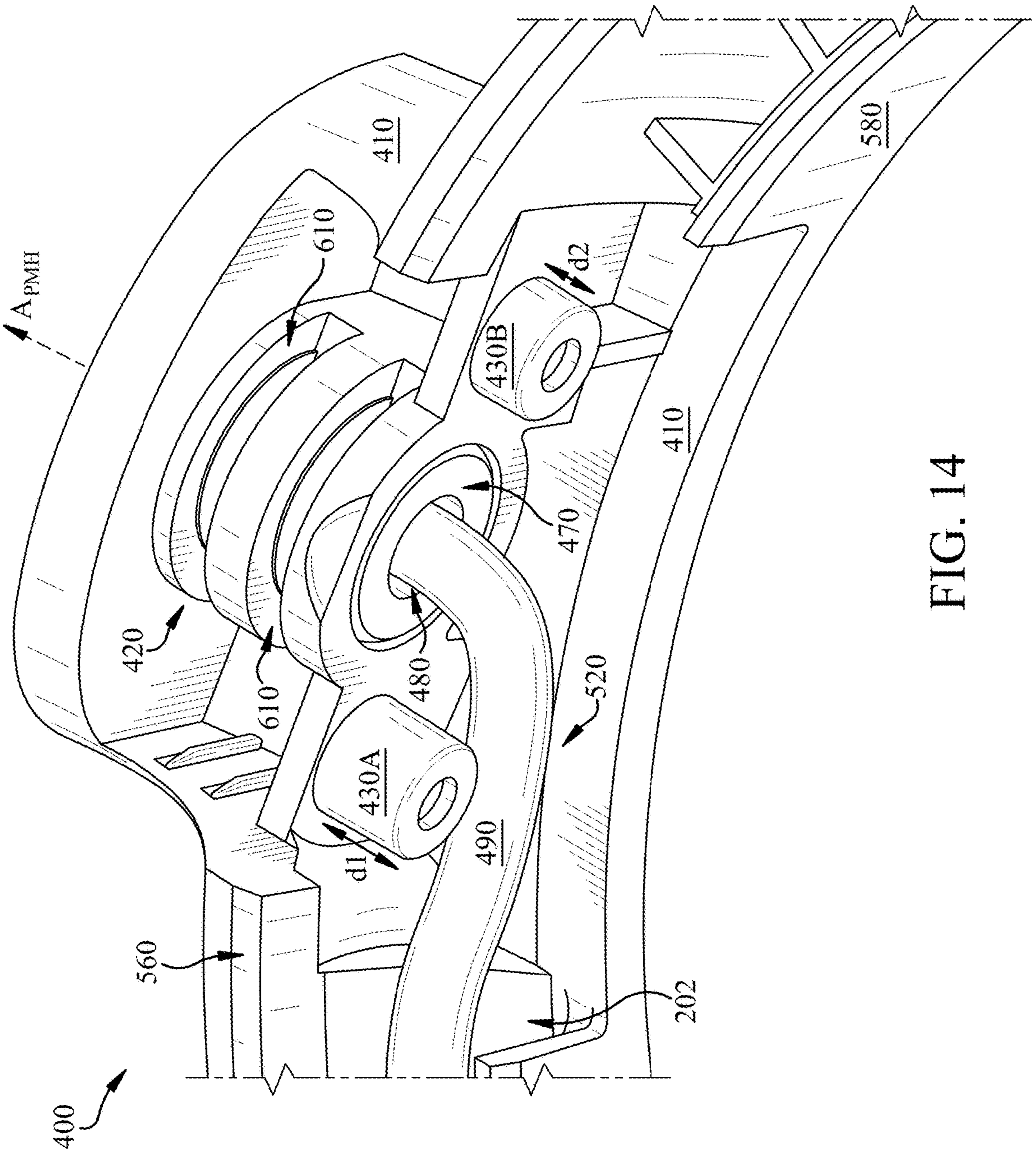
FIG. 14 shows a partial sectional view of a portion of a yoke according to various implementations.
Figure 15:
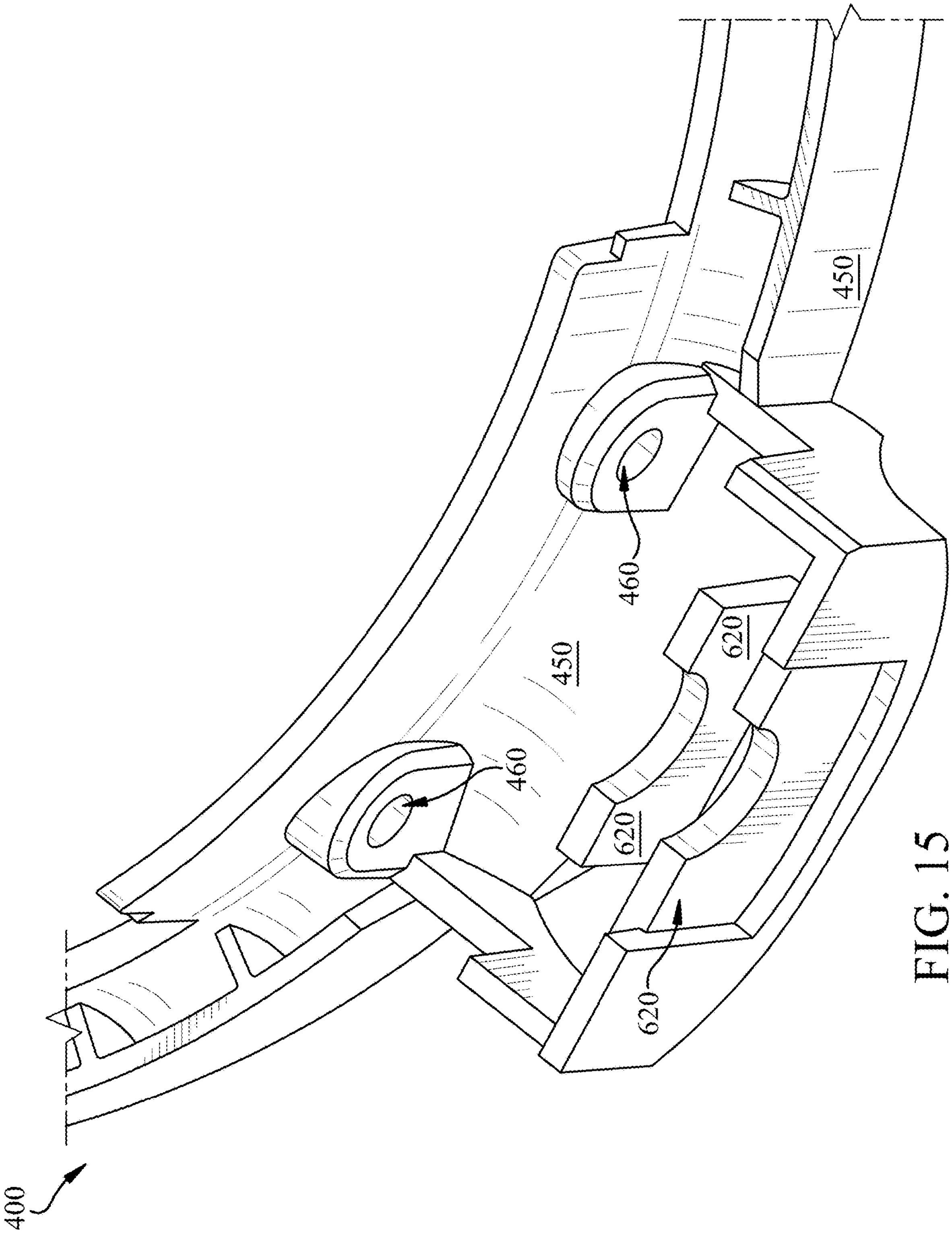
FIG. 15 shows a partial sectional view of another portion of the yoke of FIG. 14.

In some aspects, e.g., as shown in FIGS. 9, 10, and 14, the set of bosses 430 include a first boss 430A having a first depth (d1) and a second boss 430B having a second depth (d2). The first depth (d1) can provide clearance for routing of wiring 490 around the first boss 430A. In certain examples, the distinct boss depths (d1, d2) define asymmetric bosses 430 that enable routing of wiring 490. In some examples, the bend angle or turn 520 mitigates stress on the wiring 490, which can extend the lifespan and/or reliability of such wiring 490.

Figure 8:
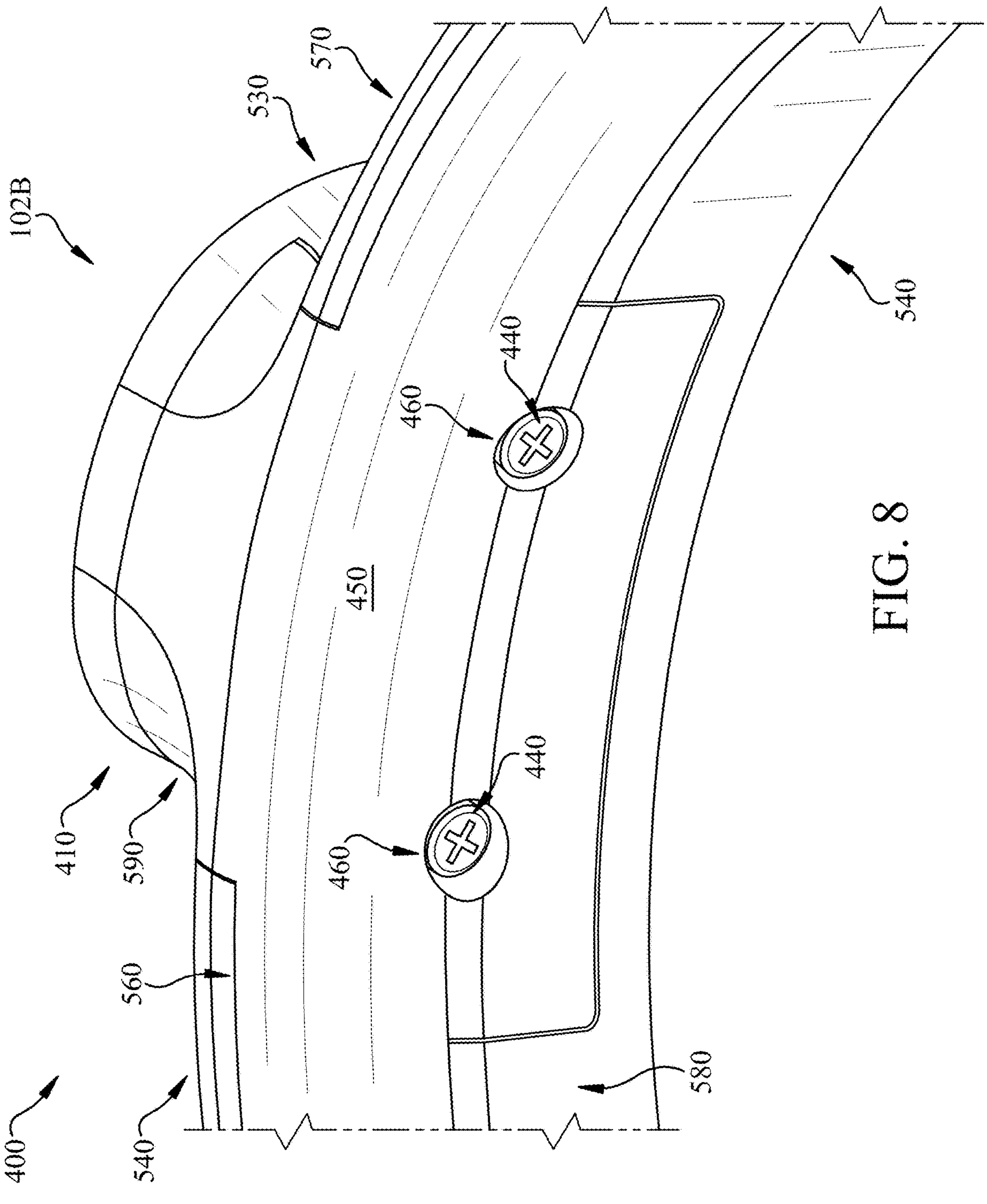
FIG. 8 is a perspective view of a yoke according to various additional implementations.
Figure 17:
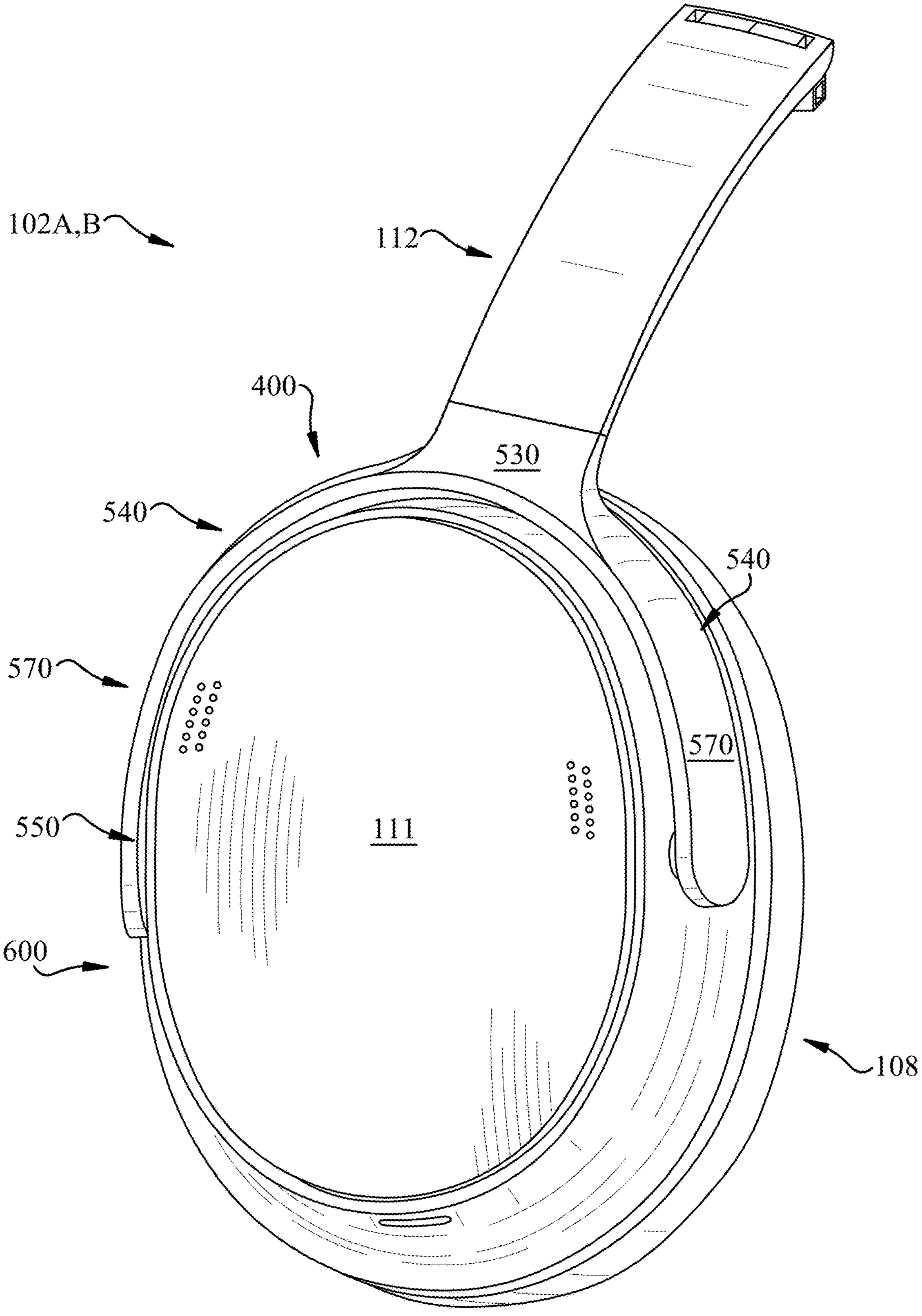
FIG. 17 shows a perspective view of a portion of a headband according to various implementations.
Figure 18:
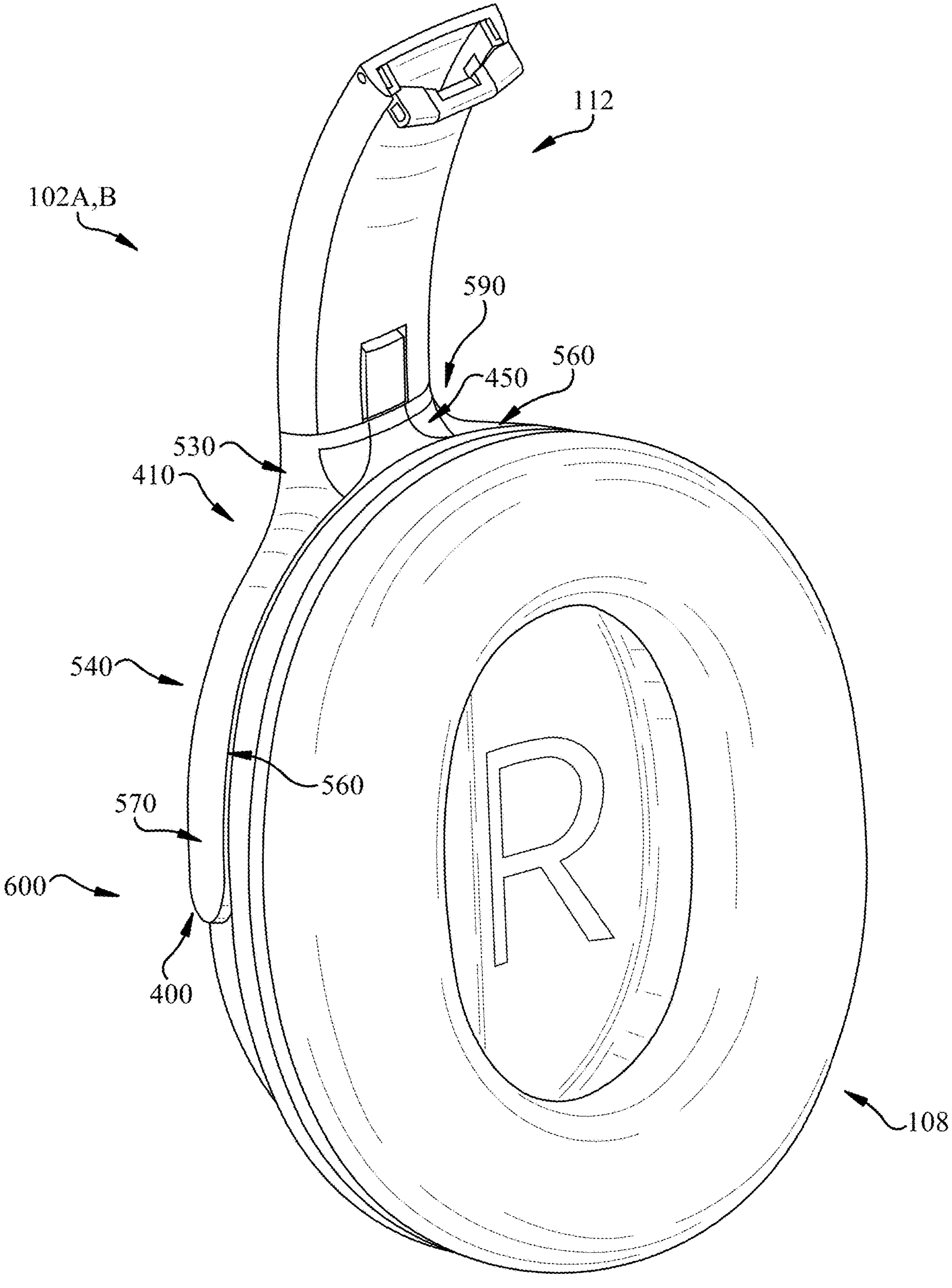
FIG. 18 shows another perspective view of the headband of FIG. 17.

According to certain implementations, as illustrated in FIGS. 8, 17, and 18, the yoke 400 includes a trunk section 530 and legs 540 extending from the trunk section 530. Legs 540 can have an outer surface 550, an inner surface 560 opposing the outer surface 550, an upper surface 570, and a lower surface 580 opposing the upper surface 570. In particular cases, the second yoke section 450 forms a portion of the inner surface 560 and the lower surface 580, and the set of couplers 440 extend through the set of slots 460 (in second yoke section 450) from the lower surface 580. In certain examples, the second yoke section 450 extends up a portion 590 of the trunk section 530 (also referred to as the neck). As illustrated in FIGS. 17 and 18, in certain implementations, the set of couplers 440 are obstructed from view from an outside 600 of the headband 200, e.g., when viewing the earcup 111.

In some further implementations, as illustrated in FIGS. 9-12, 14, and 15, the pivot member holder 420 includes a set of slots 610 that complement a set of projections 620 on the second yoke section 450. The pivot member 470 has a set of external grooves 630, where the set of projections 620 engage the external grooves 630 to secure the pivot member 470 between the first yoke section 410 and the second yoke section 450. According to various implementations, the set of projections 620 limit movement of the pivot member 470 along a primary axis primary axis ($A_{PMH}$) of the pivot member holder 420. As noted herein, the primary axis ($A_{PMH}$) of the pivot member holder 420 is the axis of wiring 490 going through the holder 420. In further examples, the pivot member 470 includes a rotation limiter 640 that interfaces with a limiter slot 650 (e.g., a cam slot) in the first yoke section 410. As noted herein, the rotation limiter 640 and corresponding slot 650 can act to limit the extent of rotation of the yoke 400 relative to the rest of the headband 102B, e.g., over a certain number of degrees such as 30 degrees, 60 degrees, 90 degrees, 120 degrees, 150 degrees, or 180 degrees.

In any case, as noted herein, the headbands disclosed according to various implementations can reduce manufacturing costs and/or complexity relative to conventional headphone headbands. For example, the headbands can minimize (or eliminate) certain fasteners to maintain the yoke coupling with the slider. Additionally, the integral yoke pivot can reduce the size of the yoke relative to conventional yokes by limiting hardware and/or fastener requirements. The yoke pivot can also enhance the useful life of the headband by reducing failures in moving components. Further, headbands employing the integral yoke pivot described herein can have a sleeker, more attractive appearance, for example, by limiting the number of visible fasteners The systems and methods disclosed herein may include or operate in, in some examples, headsets, headphones, hearing aids, or other personal audio devices, as well as acoustic noise reduction systems that may be applied to home, office, or automotive environments. Throughout this disclosure the terms "headset," "headphone," "earphone," and "headphone set" are used interchangeably, and no distinction is meant to be made by the use of one term over another unless the context clearly indicates otherwise. Additionally, aspects and examples in accord with those disclosed herein are applicable to various form factors, such as in-ear transducers or earbuds and on-ear or over-ear headphones, and others.

Examples disclosed may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For various components described herein, a designation of "a" or "b" in the reference numeral may be used to indicate "right" or "left" versions of one or more components. When no such designation is included, the description is without regard to the right or left and is equally applicable to either of the right or left, which is generally the case for the various examples described herein. Additionally, aspects and examples described herein are equally applicable to monaural or single-sided personal acoustic devices and do not necessarily require both of a right and left side.

Examples of the headphones described herein are not limited in application to the details of construction and the arrangement of components set forth in the following description or illustrated in the accompanying drawings. The headphones are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

The term "approximately" as used with respect to values herein can allot for a nominal variation from absolute values, e.g., of several percent or less. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

We claim:

1. A headphone headband, comprising:

a cushion assembly;

a slider telescopically coupled to the cushion assembly;

an earphone; and a yoke coupling the earphone to the slider, wherein the yoke includes:

a first yoke section having a first set of force-fit couplers and a pivot member holder;

a second yoke section having a second set of force-fit couplers that complement and couple with the first set of force-fit couplers on the first yoke section; and a pivot member in the pivot member holder, wherein coupling between the first yoke section and the second yoke section is maintained by interaction between the first set of force-fit couplers and the second set of force-fit couplers.

2. The headphone headband of claim 1, wherein the pivot member includes an internal slot housing wiring extending through the yoke.

3. The headphone headband of claim 1, wherein the first set of force-fit couplers and second set of force-fit couplers provide a snap fit coupling between the first yoke section and the second yoke section.

4. The headphone headband of claim 1, wherein the coupling between the first yoke section and the second yoke section is approximately entirely maintained by the interaction between the first set of force-fit couplers and the second set of force-fit couplers.

5. The headphone headband of claim 4, wherein the coupling between the first yoke section and the second yoke section is fastener-free.

6. The headphone headband of claim 1, wherein the second set of force-fit couplers include tabs having internal slots, and the first set of force-fit couplers include protrusions that mate with the internal slots.

7. The headphone headband of claim 1, wherein the pivot member holder includes a set of slots that complement a set of projections on the second yoke section.

8. The headphone headband of claim 7, wherein the pivot member has a set of external grooves.

9. The headphone headband of claim 8, wherein the set of projections engage the external grooves to secure the pivot member between the first yoke section and the second yoke section.

10. The headphone headband of claim 9, wherein the set of projections limit movement of the pivot member along a primary axis of the pivot member holder.

11. The headphone headband of claim 1, wherein the pivot member includes a rotation limiter that interfaces with a limiter slot in the first yoke section.

12. A headphone headband, comprising:

a cushion assembly;

a slider telescopically coupled to the cushion assembly;

an earphone; and a yoke coupling the earphone to the slider, wherein the yoke includes:

a first yoke section having: a pivot member holder, and a set of bosses for receiving a set of couplers;

a second yoke section having a set of slots corresponding with the set of bosses on the first yoke section;

the set of couplers extending through the set of bosses and the set of slots to couple the first yoke section and the second yoke section; and a pivot member in the pivot member holder.

13. The headphone headband of claim 12, wherein the set of couplers include a set of screws, and wherein the set of bosses and the set of slots include internal threads complementing threads on the set of screws.

14. The headphone headband of claim 12, wherein the yoke includes a trunk section and legs extending from the trunk section, the legs having: an outer surface, an inner surface opposing the outer surface, an upper surface, and a lower surface opposing the upper surface, wherein the second yoke section forms a portion of the inner surface and the lower surface, and wherein the set of couplers extend through the set of slots from the lower surface.

15. The headphone headband of claim 14, wherein the set of couplers are obstructed from view from an outside of the headband.

16. The headphone headband of claim 12, wherein the set of bosses include a first boss having a first depth and a second boss having a second depth, wherein the first depth provides clearance for routing of wiring around the first boss.

17. The headphone headband of claim 12, wherein the pivot member includes an internal slot housing wiring extending through the yoke.

18. The headphone headband of claim 12, wherein the pivot member holder includes a set of slots that complement a set of projections on the second yoke section.

19. The headphone headband of claim 18, wherein the pivot member has a set of external grooves, wherein the set of projections engage the external grooves to secure the pivot member between the first yoke section and the second yoke section, and wherein the set of projections limit movement of the pivot member along a primary axis of the pivot member holder.

20. The headphone headband of claim 12, wherein the pivot member includes a rotation limiter that interfaces with a limiter slot in the first yoke section.

* * * * *